United States Patent [19] [11] 4,123,907
Bianchetta et al. [45] Nov. 7, 1978

[54] HYDRAULIC SYSTEM HAVING SELECTIVE SIMULTANEOUS PRESSURE AND FLOW CONTROL

[75] Inventors: Donald L. Bianchetta, Coal City; Allan L. Freedy; Sammy J. Rhodes, both of Aurora, all of Ill.

[73] Assignee: Caterpillar Tractor Co., Peoria, Ill.

[21] Appl. No.: 788,855

[22] Filed: Apr. 19, 1977

[51] Int. Cl.[2] .................................... F16H 39/46
[52] U.S. Cl. .................................... 60/445; 60/486; 417/212
[58] Field of Search .................... 60/445, 448, 486; 417/212, 216

[56] References Cited

U.S. PATENT DOCUMENTS 3,841,795 10/1974 Ferre et al. .................... 60/449 X
3,922,855 12/1975 Bridwell et al. .................... 60/421

*Primary Examiner*—Edgar W. Geoghegan
*Attorney, Agent, or Firm*—James R. Bell

[57] ABSTRACT

A pressure control valve is connected to selectively supply a control pressure signal to shift a relief valve from a first low pressure mode to a second higher pressure mode and for simultaneously supplying the control pressure signal to an associated variable displacement pump for reducing the relatively high output of the pump to a relatively lower output.

6 Claims, 1 Drawing Figure

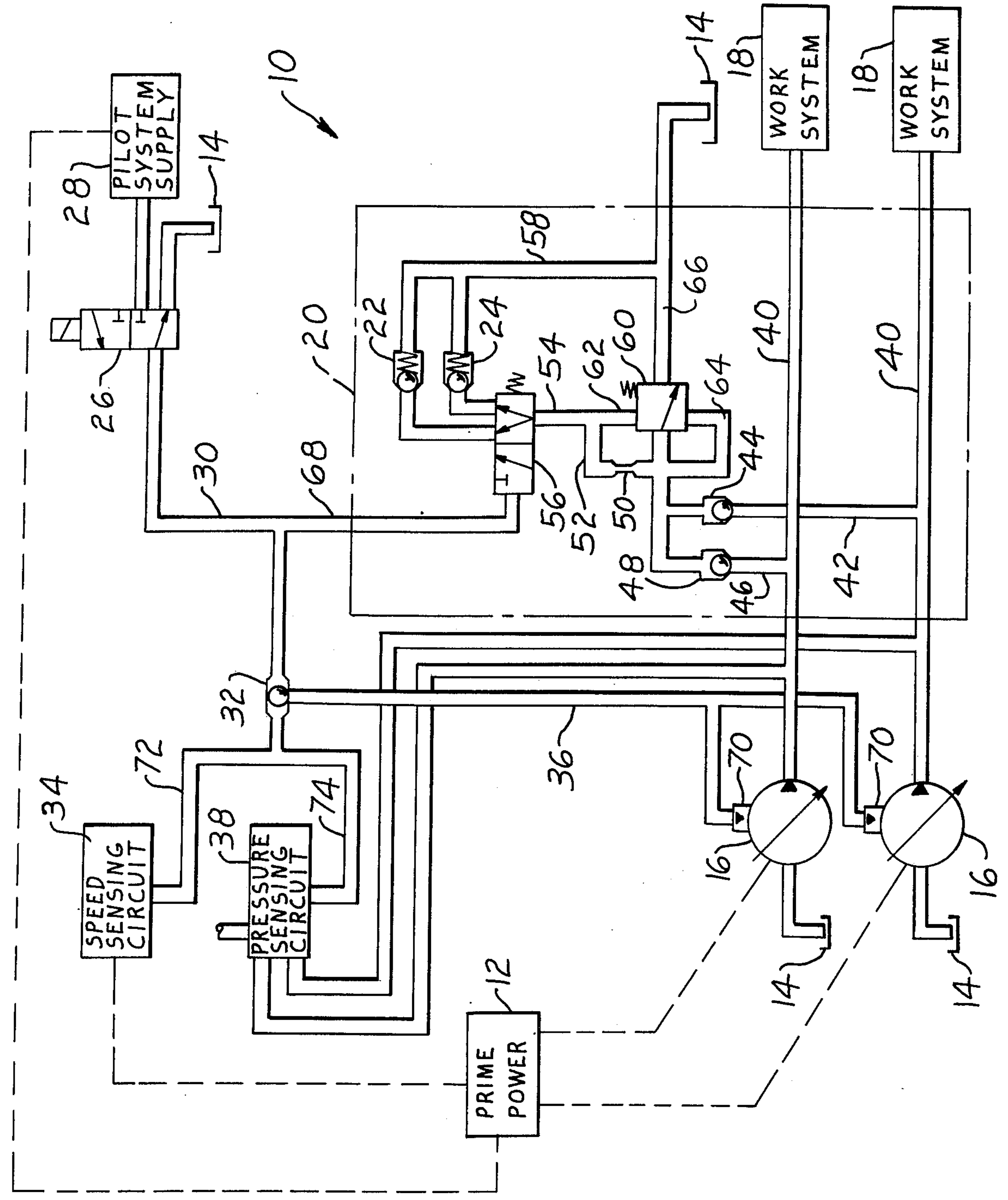
PILOT SYSTEM SUPPLY
WORK SYSTEM
WORK SYSTEM
SPEED SENSING CIRCUIT
PRESSURE SENSING CIRCUIT
PRIME POWER
10
12
14
16
18
20
22
24
26
28
30
32
34
36
38
40
42
44
46
48
50
52
54
56
58
60
62
64
66
68
70
72
74

HYDRAULIC SYSTEM HAVING SELECTIVE SIMULTANEOUS PRESSURE AND FLOW CONTROL

CROSS-REFERENCES TO RELATED APPLICATIONS

The system disclosed herein may incorporate a speed sensing circuit such as the underspeed valve and its associated fixed displacement pump, and a pressure sensing circuit such as the summing valve disclosed and claimed in U.S. Pat. No. 3,841,795 entitled "Combined Engine Speed and Pressure Responsive Control for Variable Displacement Pumps" issued on Oct. 15, 1974 in the name of Glenn E. Ferre, et al. The present system may incorporate a selector valve such as is disclosed and claimed in U.S. Pat. No. 3,922,855 entitled "Hydraulic Circuitry for an Excavator" issued on Dec. 2, 1975 in the name of John W. Bridwell, et al. The above-mentioned patents are hereby incorporated by reference into the present application and have all been assigned to Caterpillar Tractor Co., the assignee of the present application.

BACKGROUND OF THE INVENTION

1. Field of the Invention

This invention relates generally to power plants and more particularly to a pressure fluid source and motor of the type including selective or simultaneous power and manual energy inputs.

2. Description of the Prior Art

In the past, hydraulic systems such as those used to control an implement system in an excavator have included selective pressure increasing ability to the boost power requirements of the system from a normal maximum operating pressure to an increased maximum allowable operating pressure. Prolonged operation of the system at an increased pressure, however, may be detrimental due to resulting increased stress on the system components. Variable displacement pumps in the system are usually biased to operate at a relatively high flow output. Thus, the combination of increased pressure at a relatively high flow is additionally detrimental to the system. For example, in an excavator, the operator may experience a force deficiency in attempting to actuate an implement for lifting a load. By selectively increasing the maximum allowable system pressure, the force deficiency may be overcome and the boosted or increased allowable pressure may be sufficient to lift the load. Realizing the force advantage, the operator may prefer not to return to operating at the normal maximum allowable system pressure. As a result, the implement circuit is permitted to continue to operate under increased pressure and, simultaneously, the pumps continue to operate at their normal high flow output. Prolonged operation at increased pressure and high flow will increase system operating stresses that will ultimately reduce the lifetime of the system.

Also, in the past, speed sensing circuits have been used in hydraulic control systems to respond to an overload imposed on the prime power source of an associated vehicle caused by an increase in system pressure. The speed sensing circuit responds to such an overload by automatically reducing the pump output or flow. A pressure sensing circuit has also been used to sense an increase in system pressure and responds to automatically stroke the pumps back to reduce their output.

Unfortunately, no system has provided the selective pressure control simultaneously interacting with a flow control.

In view of the above, it would be advantageous to provide a hydraulic system having selective simultaneous pressure and flow control which overcomes the problems associated with the prior art.

SUMMARY OF THE INVENTION

The present invention is directed to overcoming one or more of the problems as set forth above.

According to the present invention this is accomplished by providing a system including selective pressure control simultaneously acting with a flow control. This is accomplished by providing a hydraulic system including a variable displacement pump driven by an associated prime power source for pumping a power fluid to an associated work system at a relatively high output. A pressure relief valve is connected to operate at a first maximum pressure mode and selectively at a second maximum allowable pressure mode higher than the first pressure. A pressure control valve is connected to selectively supply a control pressure signal to shift the relief valve from the first mode to the second mode and for simultaneously supplying the control pressure signal to the variable displacement pump for reducing the relatively high output to a relatively lower output.

The foregoing and other advantages will become apparent from the following detailed description of the invention when considered in conjunction with the accompanying drawing. It is to be expressly understood, however, that the drawing is not intended as a definition of the invention but is for the purpose of illustration only.

BRIEF DESCRIPTION OF THE DRAWING

The drawing FIGURE is a schematic illustration of the hydraulic system of this invention.

DETAILED DESCRIPTION

Referring now to the drawing, the hydraulic system of this invention is generally designated 10. Included in the system is a prime power source such as an internal combustion engine 12. A reservoir 14 contains a supply of suitable hydraulic fluid. Variable displacement pumps 16 are connected to be driven by engine 12 for pumping power fluid from reservoir 14 to an associated work system 18 such as an implement system in an excavator as is well known. A dual pressure relief valve 20 is operable for permitting system 10 to operate up to a first maximum pressure mode through poppet 22 and selectively up to a second maximum allowable pressure mode through poppet 24 higher than the first pressure mode.

A control valve 26 is connected to a pilot system 28 to selectively supply a control pressure signal via conduits 30 and 68 to relief valve 20 from the first mode to the second mode and for simultaneously supplying the control pressure signal to the variable displacement pumps 16, via conduit 36, for reducing the relatively high output of pumps 16 to a relatively lower output.

A speed sensing circuit 34, such as an underspeed valve and associated components, is operably connected for supplying a pressure signal to pumps 16 via conduit 36 for reducing their output. Also, a pressure sensing circuit 38 such as a summing valve and associated components used with plural variable displacement pumps is connected for supplying a pressure signal to pumps 16, via conduit 36, for reducing their output. A two-way check valve or resolver 32 can be operably connected to select the highest of the pressure signals from the speed sensing circuit, the pressure sensing circuit and the pressure control valve and supply the selected signal to the pumps 16 via conduit 36 for reducing their output.

Specifically, engine 12 supplies prime power to pumps 16, to speed sensing circuit 34 and to a pilot system supply 28. Pumps 16 are variable displacement pumps which are preferably biased to operate at a maximum output for supplying a substantially constant fluid flow from reservoir 14 to work systems 18 via conduits 40 supplying hydraulic power for operating associated implements. Fluid in the conduits 40 is also accessible to dual pressure relief valve 20 via conduit 42 through one-way check valve 44 and via conduit 46 through one-way check valve 48. The fluid is also accessible to restrictive orifice 50 in conduit 52 and through conduit 54 to pressure selector spool 56, normally open, to permit fluid access to pilot poppet 22 preferably set to permit fluid to pass therethrough only when that fluid experiences a pressure level of 4500 psi or greater. Pressure selector spool 56 is of the type disclosed in U.S. Pat. No. 3,922,855 as aforesaid. When fluid pressure is great enough to open poppet 22, fluid passes therethrough and returns to reservoir 14 via conduit 58 thus slightly relieving the pressure. However, when poppet 22 opens, fluid is permitted to flow through restrictive orifice 50 sufficient to cause a pressure differential (D*p*) thereacross. The D*p* is also experienced by dump spool 60, normally closed, via conduits 62,64, causing the dump spool to open for permitting relatively rapid flow therethrough for return to reservoir 14 via conduit 66. In this manner, excessive fluid pressure in the system is relieved. It should be noted that the use of one-way check valves 44,48 isolates the conduits 40 from each other.

Pilot system supply 28 is well known and generally includes a fixed displacement pump and a relief valve operably connected to reservoir 14. Power received from engine 12 supplies fluid to solenoid operated pressure control valve 26 from pilot system 28 and valve 26 may be selectively actuated to send a predetermined fluid pressure signal to pressure selector spool 56 of dual pressure relief valve 20 via conduit 68, and simultaneously to resolver 32 and to pump controls 70 of pumps 16 via conduit 36. When the fluid pressure signal is sensed at selector spool 56, the spool shifts to close fluid access to poppet 22 and to maintain fluid access to poppet 24 which is preferably set to permit fluid to pass therethrough from conduit 54 only when that fluid experiences a pressure level of 5000 psi or greater. When fluid pressure is great enough to open poppet 24, fluid passes therethrough and returns to reservoir 14 via conduit 58 thus slightly relieving the pressure. Flow through poppet 24 is sufficient to cause a D*p* across orifice 50 thus opening dump spool 60 as aforesaid.

Speed sensing circuit 34 is well known and generally includes a fixed displacement pump and an underspeed valve or the like of the type disclosed in U.S. Pat. No. 3,841,795 as aforesaid. Power received from engine 12 operates speed sensing circuit 34 and responds to a predetermined pressure value in the system 10 which causes engine 12 to lug or slow down and as a result reduces the speed of the fixed displacement pump in circuit 34. When speed sensing circuit 34 senses the reduction in speed of engine 12, the underspeed valve, normally closed, opens and a fluid pressure signal is sent through conduit 72, resolver 32 and conduit 36 to controls 70 of pumps 16 causing the pumps 16 to stroke back and produce less flow output as is well known.

Pressure sensing circuit 38 is well known and generally comprises a summing valve or the like of the type disclosed in U.S. Pat. No. 3,841,795 as aforesaid. Pressure in lines 40 is sensed by pressure sensing circuit 38 which sums the pressures in system 10. When the sum of the system pressures in lines 40 reaches a sufficient value, the summing valve passes a fluid pressure signal through conduit 74, resolver 32 and conduit 36 to controls 70 of pumps 16 causing the pumps to begin to stroke back as is well known.

In operation, with the system operably connected as aforesaid and engine 12 running at fast idle, pump 16 supplies fluid to fill the system 10 which fluid circulates from reservoir 14 through conduits 40, to work system 18 and returns to reservoir 14 when implements of the work system are not being utilized. When the implements are actuated to do work, resistance caused thereby creates pressure increases in the fluid in system 10.

Excessive resistance such as that experienced when excessive loading is exerted on the implements, may cause the normally varying pressure in the system to exceed 4500 psi. In this case, poppet 22 opens and sufficient flow is sensed at restrictive orifice 50 to open dump spool 60 thus relieving the pressure. The operator can selectively control allowable pressure in the system by actuating valve 26 which permits a pressure signal to shift spool 56 cutting off fluid pressure access to poppet 22 and maintaining access to poppet 24. Simultaneously, however, a pressure signal is sent to controls 70 to stroke back pumps 16 thus reducing their output and controlling flow in the system. As a result, the additional force of the system is permitted to continue but the reduced output of the pumps 16 causes slower operation of the implements of work system 18. Thus the operator is discouraged from continuing to operate the implements at increased force due to their slower, comparatively sluggish, performance. Once the increased force requirement is past, selector 26 can be returned to its normal operating position discontinuing the pressure signal from spool 56 and pumps 16. Additionally, surges in system pressure to a predetermined value can cause pressure signals to be sent to controls 70 due to actuation of either speed sensing circuit 34 or pressure sensing circuit 38. In the event that these pressure signals are automatically initiated coincidentally with manual actuation of selector 26, resolver 32 can select the greater of the pressure signals for transmitting the same to the pumps.

The foregoing has described a hydraulic system having selective simultaneous pressure and flow control.

The embodiments of the invention in which an exclusive property or privilege is claimed are defined as follows:

1. A hydraulic control system, comprising:
   variable displacement pump means driven by an associated prime power source and operatively connected for pumping power fluid to an associated work system at a relatively high output;
   pressure relief valve means operable for permitting the system to operate up to a first maximum pressure mode and selectively at a second maximum allowable pressure mode higher than the first pressure mode; and pressure control valve means operably connected to selectively supply a control pressure signal to shift the relief valve means from the first mode to the second mode and for simultaneously supplying the control pressure signal to the variable displacement pump means for reducing the relatively high output to a relatively lower output.

2. The system of claim 1, further comprising:

speed sensing circuit means operably connected for supplying a pressure signal to the variable displacement pump means for reducing the relatively high output to a relatively lower output in response to a predetermined increase in pressure in the system;

pressure sensing circuit means operably connected for supplying a pressure signal to the variable displacement pump means for reducing the relatively high output to a relatively lower output in response to a predetermined increase in pressure in the system; and resolver means operably connected for selecting the highest of the pressure signals from the speed sensing circuit, the pressure sensing circuit and the pressure control valve means and supplying the selected signal to the variable displacement pump means for reducing the relatively high output to a relatively lower output.

3. A hydraulic control system, comprising:

a prime power source;

a supply of power fluid;

variable displacement pump means driven by the prime power source and operably connected for pumping the power fluid from the supply to an associated work system;

pressure relief valve means operably connected for permitting the system to operate up to a first maximum pressure mode and selectively at a second maximum allowable pressure mode higher than the first pressure mode;

pressure control valve means operably connected to selectively supply a control pressure signal to shift the relief valve means from the first mode to the second mode; and a conduit connected to supply the control pressure signal to the variable displacement pump means simultaneously with the control pressure signal supplied to the relief valve means.

4. The system of claim 3, further comprising:

speed sensing circuit means operably connected for supplying a pressure signal to the variable displacement pump means for reducing the relatively high output to a relatively lower output in response to a predetermined increase in pressure in the system.

5. The system of claim 4, further comprising:

pressure sensing circuit means operably connected for supplying a pressure signal to the variable displacement pump means for reducing the relatively high output to a relatively lower output in response to a predetermined increase in pressure in the system.

6. The system of claim 5, further comprising:

resolver means operably connected for selecting the higher of the pressure signals from the speed sensing circuit, the pressure sensing circuit and the pressure control valve means and supplying the selected signal to the variable displacement pump means for reducing the relatively high output to a relatively lower output.

* * * * *